March 24, 1970    J. F. INGLE ET AL    3,502,983
SIGNAL PEAK-TO-AVERAGE RATIO DETECTOR
Filed Nov. 20, 1968    2 Sheets-Sheet 1
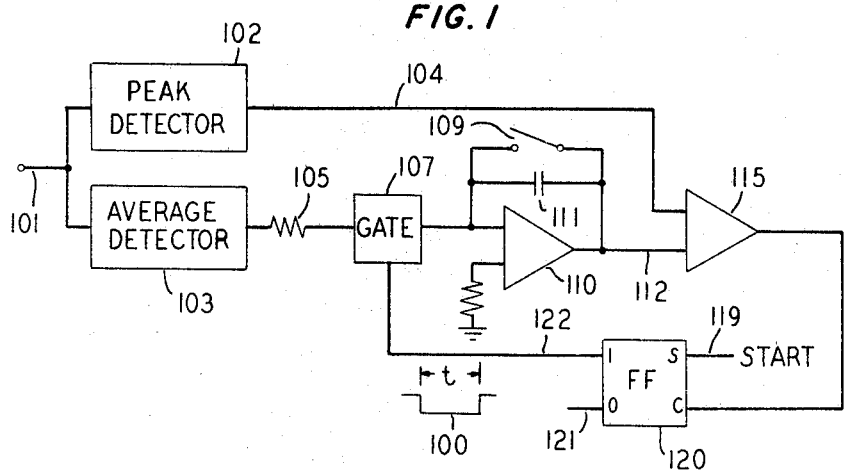
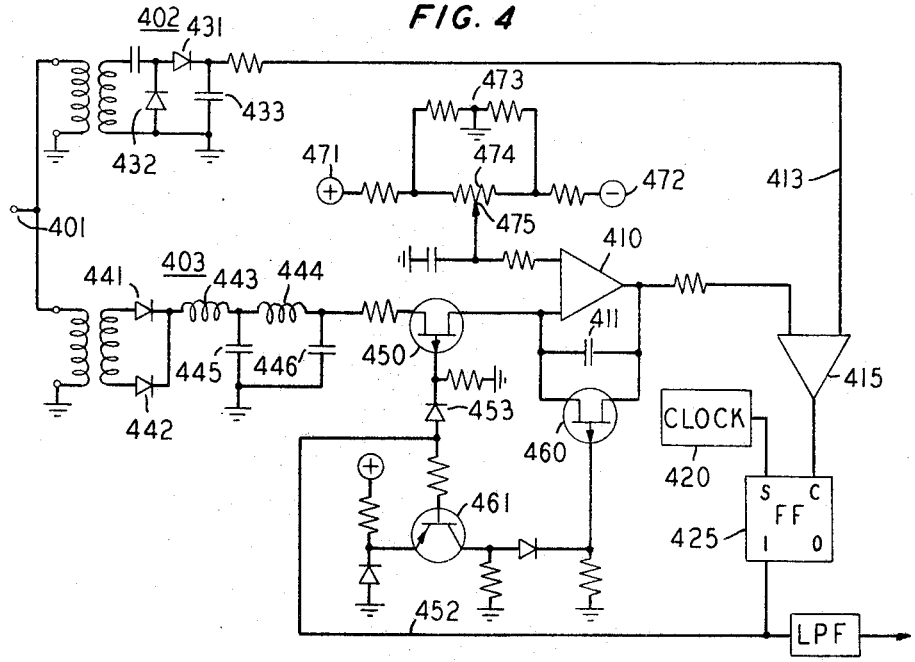
INVENTORS J. F. INGLE
G. E. McLAUGHLIN
BY Alfred J. Steinmetz
ATTORNEY March 24, 1970 J. F. INGLE ET AL 3,502,983
SIGNAL PEAK-TO-AVERAGE RATIO DETECTOR
Filed Nov. 20, 1968 2 Sheets-Sheet 2 ent Office 3,502,983
Patented Mar. 24, 1970

1

3,502,983
SIGNAL PEAK-TO-AVERAGE RATIO DETECTOR
James F. Ingle, Fair Haven, and George E. McLaughlin, Colts Neck, N.J., assignors to Bell Telephone Laboratories, Incorporated, Murray Hill, N.J., a corporation of New York
Filed Nov. 20, 1968, Ser. No. 777,332
Int. Cl. G01r 7/04
U.S. Cl. 324—140
8 Claims

ABSTRACT OF THE DISCLOSURE

The fidelity of a transmission facility is determined automatically by apparatus to measure the peak-to-average ratio of a test signal transmitted through the transmission facility. The average value of the test signal is integrated and compared with the peak value of the test signal. The time duration necessary for the integrated value to accumulate to the peak value is representative of the peak-to-average ratio.

FIELD OF THE INVENTION

This invention relates to signal distortion analyzers to evaluate the suitability of a transmission facility for data transmission and, more particularly, to a signal ratio analyzer to evaluate such suitability by measuring the peak-to-average ratio of a test signal transmitted through the transmission facility.

BACKGROUND OF THE INVENTION

In digital data transmission facilities, the waveforms of transmitted pulse signals may be significantly altered by amplitude and phase distortion. The received pulse signals may be restored to their original transmitted amplitude, but the distortion may still persist in the form of altered phase and amplitude relationships of the various frequency components of the received signal. These distortions may lead to intersymbol interference and may alter the information content contained in the digital signal. Hence, it is desirable to measure the fidelity of digital data transmission facilities to evaluate the probability of erroneous information transmittal due to distortion by the transmission system.

The fidelity of transmission in a digital transmission facility may be evaluated by measuring and comparing the ratio of the peak value to the full-wave rectified average value of the transmitted and received pulse signals. In instances where the energy of the transmitted pulse is dispersed in time, that is, spread out in a time exceeding the transmitted pulse duration, the ratio of the peak value to the average value of the received pulse signal is significantly reduced. This measured peak-to-average ratio may be used to analyze such transmission facility factors as amplitude attenuation and phase distortion.

The aforementioned transmission facility fidelity evaluation is performed by transmitting pulse signals with a controlled peak-to-average ratio through the transmission facility under test and measuring the peak-to-average ratio of the received pulse signals. The duration of the pulses is considerably less than the spacing between pulses so that the transients of successive pulses do not interfere with each other. The particular waveform of the pulses may be selected to test specific transmission properties of a particular transmission facility. For example, the pulse waveform may be selected to test a particular form of data transmission or to limit the signal energy to a particular frequency spectrum.

In one particular test method of measuring the peak-to-average ratio of a pulse signal, the pulse signal is normalized to some reference signal level and rectified at the receiving terminal to determine its peak value and its average value. The peak value and average value is applied to an indicating meter which indicates the peak-to-average ratio by measuring the signal difference between the peak and average values. This difference is compared to a preset calibrated difference related to an optimum peak-to-average ratio. This measurement method, however, varies in accuracy as the received signal level of the pulse signal varies for the level at which the meter was calibrated.

It is therefore an object of the invention to accurately determine the peak-to-average ratio of a signal automatically without having to calibrate the measuring instrument with respect to the magnitude of the signal being tested.

SUMMARY OF THE INVENTION

Therefore, in accord with the present invention, a low duty cycle pulse signal is transmitted through a transmission facility under test. At the receiving end of the facility the peak and average values of the pulse signal are detected. The average value is integrated and continuously compared with the detected peak value. When the amplitudes of the two values are equal a switching arrangement is activated to terminate the integrating action and to indicate its time duration. The time duration of the integrating action is directly proportional to the peak-to-average signal ratio being measured.

An advantage of the signal ratio analyzer according to the invention is the automatic determination of the peak-to-average ratio without the necessity of calibrating the ratio measuring instruments with respect to the absolute peak or average values of the signal being analyzed.

DESCRIPTION OF THE DRAWINGS

Many other advantages and features of the invention will be apparent upon inspection of the accompanying drawings in connection with the following detailed description wherein:

FIG. 1 is a block diagram of one embodiment of the invention;

FIG. 4 is a schematic diagram partially in block form of the embodiment of the invention shown in FIG. 2.

DETAILED DESCRIPTION

Figure 2:
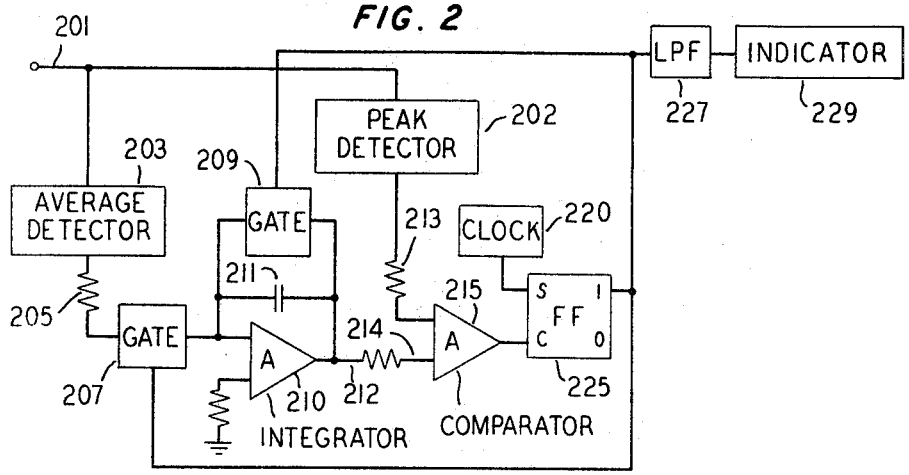
FIG. 2 is a block diagram of another embodiment of the invention.

The signal ratio analyzer disclosed in FIG. 1 generates a pulse signal 100 whose duty cycle or duration $t$ is proportional to the peak-to-average ratio of a signal transmitted over a transmission facility and applied to input lead 101. This peak-to-average ratio is a quantitative rating of the fidelity of the transmission facility.

The signal whose peak-to-average ratio is to be determined is applied to the input 101 of the analyzer. This input signal is applied to a signal peak detector 102 and a signal average detector 103. The peak detector 102 detects the peak value of the incoming signal and applies this value, via lead 104, to a comparator 115, described below. The average detector 103 determines the average of the incoming signal and applies this average value, via the resistor 105, to a gate 107 which is coupled to the operational amplifier 110. The operational amplifier 110 continuously integrates the average value of the incoming signal and applies it to the comparator 115. The comparator 115 continuously compares this integrated average value with the peak value of the incoming signal. When the two signals applied to the comparator 115 are equal the comparator 115 changes state. The output of the comparator 115 controls the bistable multivibrator 120, as described below. The duration $t$ of the pulse 100, generated by the bistable multivibrator 120, is directly proportional to the peak-to-average ratio of the signal being analyzed.

The feedback capacitor 111 of the operational amplifier 110 is discharged prior to a ratio measurement by the momentary closing of the switch 109 to complete a discharge path. The ratio measurement process is initiated by applying an activating pulse to the multivibrator set input 119. This switches the multivibrator 120 into its set state and, hence, an enabling signal is applied, via lead 122, to the signal gate 107 enabling signal transmission therein. Thus, the average value of the incoming signal, as determined by the average detector 103, is applied, via the gate 107, to the operational amplifier 110.

The feedback capacitor 111 integrates the average value of the incoming signal as determined by the average detector 103 and applies it, via the lead 112, to the comparator 115. The peak value of the incoming signal, as determined by the peak detector 102, is also applied, via lead 104, to the comparator 115. When the integrated value of the average of the incoming signal equals the peak value, the output signal of the comparator 115 reverses polarity. The signal transition due to the reversal of the polarity of the output of the comparator 115 is utilized to reset the multivibrator 120 which, in turn, disables the signal transmission gate 107.

The aforementioned operational amplifier 110 comprises a high gain DC differential amplifier. The integrating feedback capacitor 111 is connected between the output and the inverting input of the amplifier. The non-inverting input is grounded. The comparator 115 comprises a high gain differential amplifier with a limiter in order to generate a binary output. Both the operational amplifier 110 and the comparator 115 are well known in the art, and it is not believed necessary to discuss them in detail. Suitable peak and average signal detectors for use in the invention are disclosed herein below.

The elapsed time $t$ during which the multivibrator 120 is in its set state is directly proportional to the peak-to-average ratio of the signal being analyzed. This proportion may be described by the following voltage relations where:

The integrated average voltage $E_i$ is:

$$E_i = \frac{1}{RC} \int_0^t E_{AV} dt = \frac{1}{RC} E_{AV} t \qquad (1)$$

$E_{AV}$ is the average voltage determined by the average detector 103.
R is the resistance of resistor 105
C is the capacitance of capacitor 111
$t$ is the time of integration When the integrated voltage $E_i$ equals the peak voltage $E_p$ the elapsed time $t$ is $$t = \frac{E_i}{E_{AV}} (RC) = \frac{E_p}{E_{AV}} (RC) \qquad (2)$$

This elapsed time $t$ is represented by the duration of the pulse 100 on output lead 121. This pulse 100 may be used to gate a periodic pulse source into a counter or may be integrated to establish a voltage level in order to indicate the measured peak-to-average ratio.

Figure 3:
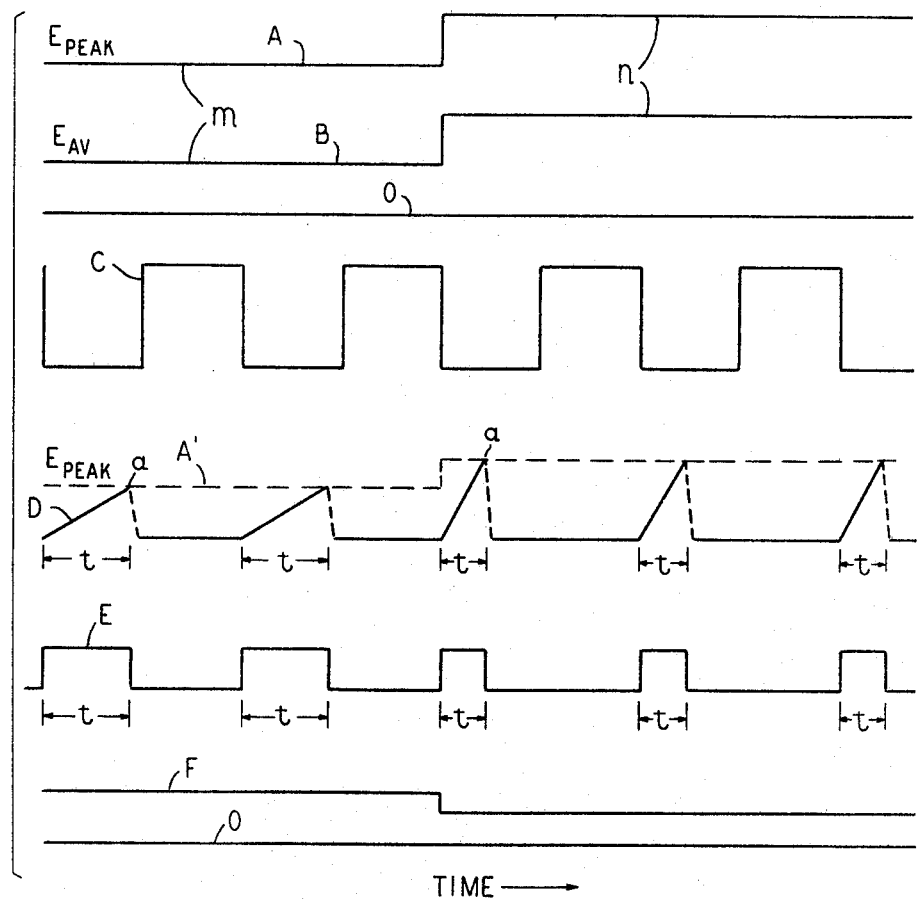
FIG. 3 illustrates the voltage waveforms of the embodiment disclosed in FIG. 2.

A signal ratio analyzer to continuously monitor a peak-to-average signal ratio is shown in FIG. 2. The signal whose peak-to-average ratio is being measured is applied to the input terminal 201 which is coupled to the peak detector 202 and the average detector 203. The response of the peak detector 202 to the input signal is shown by waveform A in FIG. 3. The response of the average detector 203 to the input signal is shown by waveform B in FIG. 3. The waveforms A and B are both referenced to a common reference zero voltage level represented by the horizontal axis O. Waveforms A and B depict, for illustrative purposes, the response of the peak and average detectors 202 and 203 to a high peak-to-average ratio $m$ subsequently followed by a lower peak-to-average ratio $n$.

The average value A of the input signal is applied to the operational amplifier 210, via the resistor 205 and the gate 207 where it is integrated by the integrating feedback capacitor 211. A discharge path shunting the integrating feedback capacitor 211 includes a gate 209 which is controlled by a bistable multivibrator 225. The bistable multivibrator 225 is set to produce a high level signal output in response to the negative transition of the pulse output of the periodic clock source 220 as shown by waveform C. The bistable multivibrator 225 is cleared and the high level signal output terminated in response to the negative transition of the signal output of the comparator 215. The signal output of the bistable multivibrator 225 is illustrated by waveform E in FIG. 3. The gate 209 is opened to disable signal transmission during the integration periods shown by the intervals $t$ in waveform D in FIG. 3. The gate 209 is closed following each integration period $t$ to discharge the capacitor 211.

At the beginning of an integration cycle, the gate 209 is opened and the gate 207 is closed in response to the set state pulse output of the multivibrator 225. The design of a pulse responsive gate is well known and hence it is not believed necessary to describe gates 207 and 209 in detail. With gate 207 closed and gate 209 open, the feedback capacitor 211 begins integrating the average value of the test signal shown by waveform B and supplied at the output of the average detector 203. This integrated average value, illustrated by waveform D in FIG. 3, appears at the output 212 of the operational amplifier 210 which is coupled to the input 214 of the comparator 215. The peak value of the signal determined by the peak detector 202, shown by waveform A' in FIG. 3, adjoining waveform D, is applied to the input 213 of the comparator 215. When the integrated value of the average value of the signal equals the peak value of the signal, as illustrated at point $a$ on waveform D in FIG. 3, the output signal of the comparator 215 changes polarity with a negative signal transition.

The output signal of the comparator 215 is applied to the bistable multivibrator 225. The negative transition in the output signal of the comparator 215 at the end of the integration period $t$ switches the multivibrator 225 into its clear state thereby opening the gate 207 and closing the gate 209 to discharge the feedback capacitor 211.

The signal output of the bistable multivibrator 225, as shown by waveform E, changes state in response to the signal output of the comparator 215 when the integrated value of the averaged signal, as shown by waveform D, equals the peak value, as shown by waveform A' at point $a$. The duration of the high level signal output of the bistable multivibrator 225 is directly proportional to the peak-to-average ratio of the input signal being analyzed. The signal output of the bistable multivibrator 225 is applied to a low-pass filter 227 which derives a DC voltage level therefrom as shown by waveform F in FIG. 3. This DC voltage level is measured by an indicator circuit 229, which may comprise a voltmeter, to indicate the magnitude of the peak-to-average ratio.

The signal ratio analyzer disclosed in FIG. 4 is a more detailed example of the embodiment disclosed in FIG. 2. The input signal, whose peak-to-average ratio is to be measured, is applied, by input lead 401, to the peak detector 402 and the average detector 403. The peak detector 402 comprises a voltage-doubler rectifier including the diodes 431 and 432. The capacitor 433 smooths the output signal of the rectifier. This rectified peak signal value is applied, via lead 413, to the comparator 415.

The average detector 403 comprises a full-wave rectifier including the diodes 441 and 442 and the inductive capacitor filter circuit including the inductors 443 and 444 and the capacitors 445 and 446. The signal output of the average detector 403 is applied, via the field effect transistor 450, to the input of the operational amplifier 410.

The field effect transistor 450 corresponds in function to the signal gate 207 shown in FIG. 2. The field effect transistor 460 shunting the feedback capacitor 411 corresponds in function to the gate 209 shown in FIG. 2. The two field effect transistors 450 and 460 both respond to the signal output of the bistable multivibrator 425 and, hence, are synchronized with the measurement period established by the clock 420. The multivibrator signal output is applied to the field effect transistor 450, via the lead 452, and the diode 453 to bias it into conduction during the measurement period. The multivibrator signal output also controls the field effect transistor 460, via the inverting transistor 461. The high level signal output of the bistable multivibrator 425 biases the transistor 461 into conduction, enabling the positive source to bias the field effect transistor 460 into its nonconducting state. The field effect transistor 460 in its conducting state completes a current path to discharge the integrating feedback capacitor 411 between the integration intervals established by the high level signal output of the bistable multivibrator 425.

A biasing circuit coupled to the noninverting input of the operational amplifier 410 is utilized to adjust its output voltage in order to match it to the threshold voltage at the input of the comparator 415. The voltage threshold at the input of the comparator 415 at which its output signal changes state is at some small finite voltage other than zero. This threshold voltage is a characteristic of each particular comparator and is due to internal bias currents and residual stored charges on the comparator circuit components. The biasing circuit comprises a positive potential 471 and a negative potential 472 coupled by a voltage divider 473. The voltage divider 473 is shunted by a potentiometer 474 with an adjustable contact 475 to control the reference voltage applied to the operational amplifier 410.

Since the overall operation of the signal ratio analyzer shown in FIG. 4 has been discussed with reference to FIG. 2, it is not believed necessary to describe the operation of the analyzer shown in FIG. 4 in detail.

While the foregoing invention has been described with reference to two particular embodiments, it is to be understood that many variations and substitutions may be made thereto without departing from the spirit and scope of the invention. The invention, for instance, may also be advantageously used to determine the ratio of two independent signals. Many other applications and embodiments of the invention will be apparent to those skilled in the art and need not be discussed in detail.

What is claimed is:

1. A ratio detector to measure the ratio of a first and a second signal comprising, means to integrate said first signal, means to compare the integrated value of said first signal with the amplitude of said second signal, said means to compare having two alternate output signal states responsive to a comparison of the respective amplitudes of said integrated value of said first signal and said second signal, means to terminate the integration of said first signal in response to a change in state in the signal output of said means to compare, and means to indicate said ratio by measuring the duration of the integration of said first signal by said means to integrate.

2. A ratio detector as defined in claim 1 wherein said means to terminate comprises means to periodically discharge energy storage means in said means to integrate including a bistable multivibrator responsive to said means to compare and a discharge path including switching means responsive to said bistable multivibrator.

3. A ratio detector as defined in claim 2 wherein said means to terminate further comprises means responsive to said change in state to disconnect said means to integrate from said first signal and said means to indicate said ratio comprises means to measure the pulse output duration of said bistable multivibrator during the integration of said first signal.

4. A ratio detector as defined in claim 1 wherein said means to indicate comprises a bistable multivibrator responsive to a change of state of the output of said means to compare and means to integrate the pulse output of said bistable multivibrator.

5. A peak-to-average ratio detector comprising in combination, a signal whose peak-to-average ratio is to be measured, means to detect the peak value of said signal, means to detect the average value of said signal, means for integrating the average value of said signal, means to compare the amplitude of the integrated average value of said signal with the amplitude of the peak value of said signal, means responsive to said means to compare to terminate the integration of said average value when said integrated average value equals said peak value and means to indicate the time duration of the integration of the average value of said signal.

6. A peak-to-average ratio detector as defined in claim 5 wherein said means for integrating comprises an operational amplifier with a feedback capacitor and said means to terminate includes switching means responsive to said means to compare to discharge said feedback capacitor.

7. A peak-to-average ratio detector as defined in claim 6 wherein said means to terminate further comprises means to disconnect said operational amplifier from said average value of said signal.

8. A peak-to-average signal ratio measurement apparatus comprising means to derive the peak and average values of a signal, means to integrate the average value, means to compare the integrated average value with said peak value, switching means responsive to the equality of said integrated average value and said peak value to terminate the integration of said average value, and means to indicate the time duration of the integration of said average value.

References Cited

UNITED STATES PATENTS

| | | | |
|---|---|---|---|
| 2,712,038 | 6/1955 | Carver | 328—163 XR |
| 2,896,165 | 7/1959 | Hornig et al. | |
| 3,456,079 | 7/1969 | Wallace | 178—69 |

ALFRED E. SMITH, Primary Examiner

U.S. Cl. X.R.

178—69; 235—196; 328—161,162